UNITED STATES PATENT OFFICE.

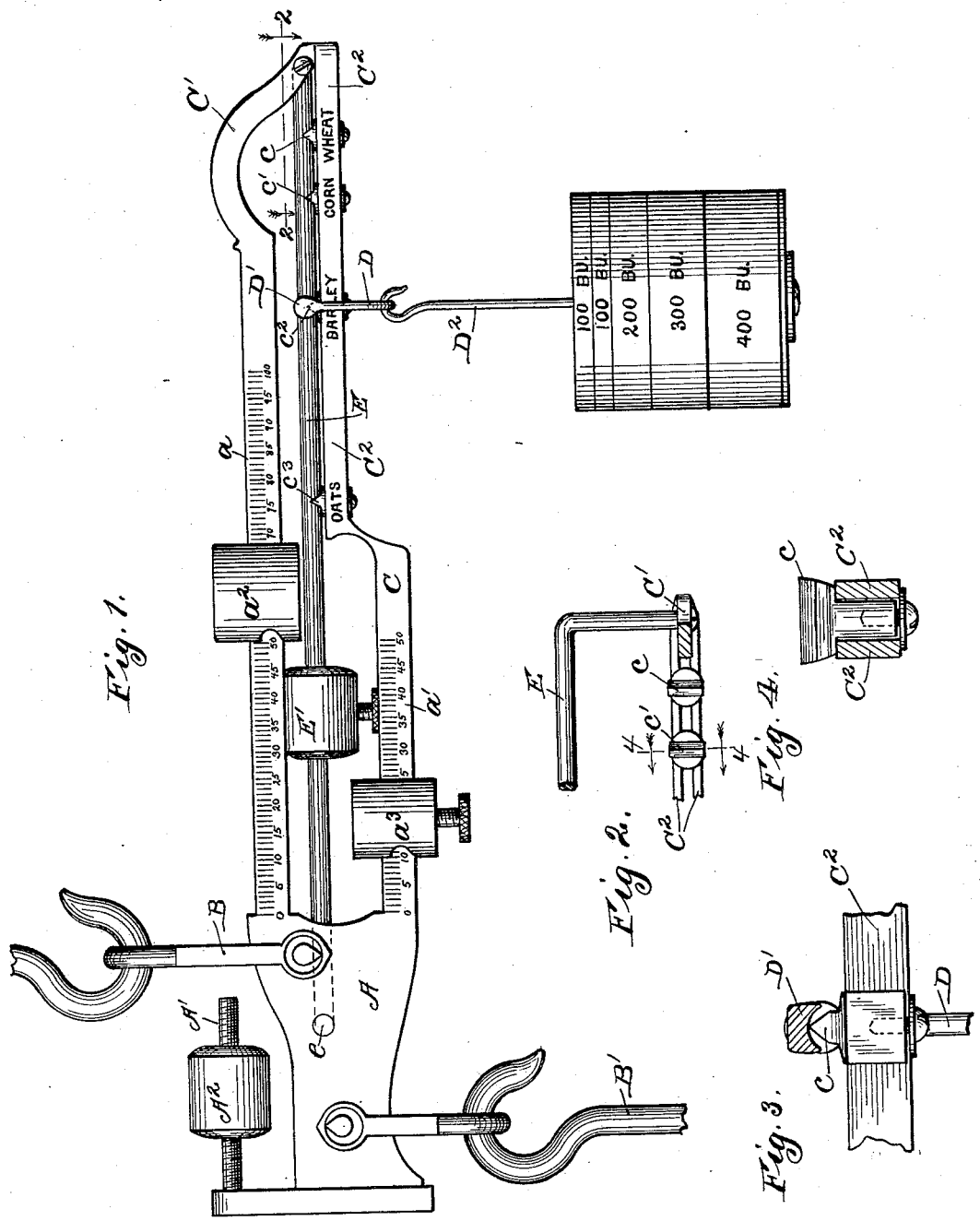

GEORGE H. FROGGATT, OF CHICAGO, ILLINOIS.

SCALE OR WEIGHING-BEAM.

SPECIFICATION forming part of Letters Patent No. 566,160, dated August 18, 1896.

Application filed December 4, 1895. Serial No. 571,006. (No model.)

*To all whom it may concern:*

Be it known that I, GEORGE H. FROGGATT, of Chicago, county of Cook, and State of Illinois, have invented certain new and useful Improvements in Scales or Weighing-Beams, of which the following is a specification.

This invention relates to improvements in scales or weighing-beams, and while it is more especially designed to be used in grain-elevators or for the purpose of weighing grain, such as wheat, corn, barley, and rye, yet it is applicable and adapted to be used on scales for other purposes; and it consists in certain peculiarities of the construction, novel arrangement, and operation of the various parts thereof, as will be hereinafter more fully set forth and specifically claimed.

The objects of my invention are, first, to provide a scale or weighing-beam which shall be simple and inexpensive in construction and efficient and accurate in operation, and, second, such a beam which, by reason of its peculiar construction and the arrangement of its parts, will indicate in bushels or by determined units of weight the quantity of the material being weighed, thus dispensing with the necessity of making calculations or of referring to charts to ascertain the desired information.

In order to enable others skilled in the art to which my invention pertains to make and use the same, I will now proceed to describe it, referring to the accompanying drawings, in which—

Figure 1 is a view in front elevation of my scale or weighing-beam, showing it ready for use. Fig. 2 is a plan sectional view of a portion of the beam, taken on line 2 2 of Fig. 1. Fig. 3 is a view in side elevation of a portion of the beam and one of the indicating-pivots thereon, and illustrating, partly in section, a portion of a weight-holder; and Fig. 4 is a cross-sectional view taken on line 4 4 of Fig. 2, showing the pivot-piece in elevation.

Similar letters refer to like parts throughout the different views of the drawings.

A represents a beam, which is provided, as usual, with a counterbalancing-weight $A^2$, mounted on a stem $A'$, secured on the beam near its fulcrumed portion. The beam A is pivotally secured in a suitable suspending device B, and is similarly connected to a rod $B'$ for the platform or weighing-surface. The free portion of the beam A is provided with an upper and lower graduated scale $a$ and $a'$, respectively, upon which are located movable weights $a^2$ and $a^3$, respectively. The arm C, or that portion of the beam provided with the lower graduating-marks or scales, is extended outwardly and is joined to the end of the arm $C'$, upon which the upper graduating-marks are placed. The extended portion $C^2$ of the lower arm or part of the beam is usually formed of two parallel pieces, as shown in Fig. 2 of the drawings, between which is passed a series of pivot-pieces $c$, $c'$, $c^2$, and $c^3$, the upper ends of which are angular, as shown, and are for the reception and retention of a movable weight-holder D, which is in the shape of a link or oblong ring, with the upper portion $D'$, which may be pivotally or loosely secured in said ring, so as to allow of a free movement of the pendant $D^2$ or weight-support.

The pivot-pieces are secured in position by means of screws or otherwise, and are so arranged that they may be moved to any desired point between the parallel bars $C^2$, when two bars are used, as in the present construction; but I may sometimes employ only one bar for the extended portion $C^2$, in which case the pivot-pieces may be secured thereon in any suitable manner.

To the rear of the beam A, and secured at one of its ends to near the fulcrum-point thereof, as at $e$ in Fig. 1 of the drawings, and at its other end to the free end of the arm $C'$, is secured a rod E, upon which is movably located a weight $E'$, to be employed in counterbalancing the weight of the receptacle in which the grain or other article is held while being weighed.

The operation of my scale or beam is virtually the same as that of the scales which are now in general use, that is, so far as ascertaining the weight of a quantity of material by pounds only, and for this reason I shall not enter into the explanation of such, but will simply refer to and describe the operation of my improvement, which consists in the addition of the counterbalancing-rod E and of the series of pivot-pieces arranged on the beam at proper points to indicate the weight of material by bushels or a given or determined unit of measure.

My invention also consists in the use of the weight-holder having the pivoted portion D' to rest on the pivot-pieces.

From the foregoing and by reference to the drawings it will be seen and readily understood that if it is desired to weigh, for example, eleven hundred bushels of barley, the weight-holder D will be placed on the pivot-piece $c^2$, and marked "Barley," on the arm of the beam, or if a smaller or greater quantity of the same kind of grain shall be required to be weighed the weights on the rod or support $D^2$ shall be changed to suit the circumstances.

If it is desired to weigh wheat, corn, or oats, the weight-holder may be transferred to the desired pivot-piece, which will indicate at a glance the number of bushels of the kind of grain being weighed.

Having thus fully described my invention, what I claim as new, and desire to secure by Letters Patent, is—

1. In a scale or weighing-beam, the combination with a beam provided with graduating-marks and weights, of a series of pivot-pieces arranged on said beam at points to indicate the weights of the different articles or material by a determined unit of measure, and a movable weight-holder adapted to rest on said pivot-pieces, substantially as described.

2. The combination with the beam A, having the portions C', and C, provided with the graduating-marks $a$, and $a'$, respectively, the extended part $C^2$, on the part C, a series of pivot-pieces located on the part $C^2$, and a weight-holder adapted to rest on said pivot-pieces, substantially as described.

3. The combination with the beam A, having the rod E, provided with an adjustable weight, and also the portions C', and C, provided with the graduating-marks $a$, and $a'$, respectively, the extended part $C^2$, on the part C, a series of pivot-pieces having angular heads and located on the part $C^2$, and a weight-holder adapted to rest on said pivot-pieces, substantially as described.

GEORGE H. FROGGATT.

Witnesses:
 CHAS. C. TILLMAN,
 E. A. DUGGAN.